Nov. 5, 1963
E. PICARD
3,109,929
DEVICES FOR THE AUTOMATIC MONITORING OF THE VARIATIONS OF A
PHYSICAL MAGNITUDE AT A MULTIPLICITY OF DISTINCT POINTS
AND IN PARTICULAR FOR DETECTING CAN LEAKS IN THE
CHANNELS OF A HETEROGENEOUS NUCLEAR REACTOR
Filed Feb. 16, 1960
5 Sheets-Sheet 1
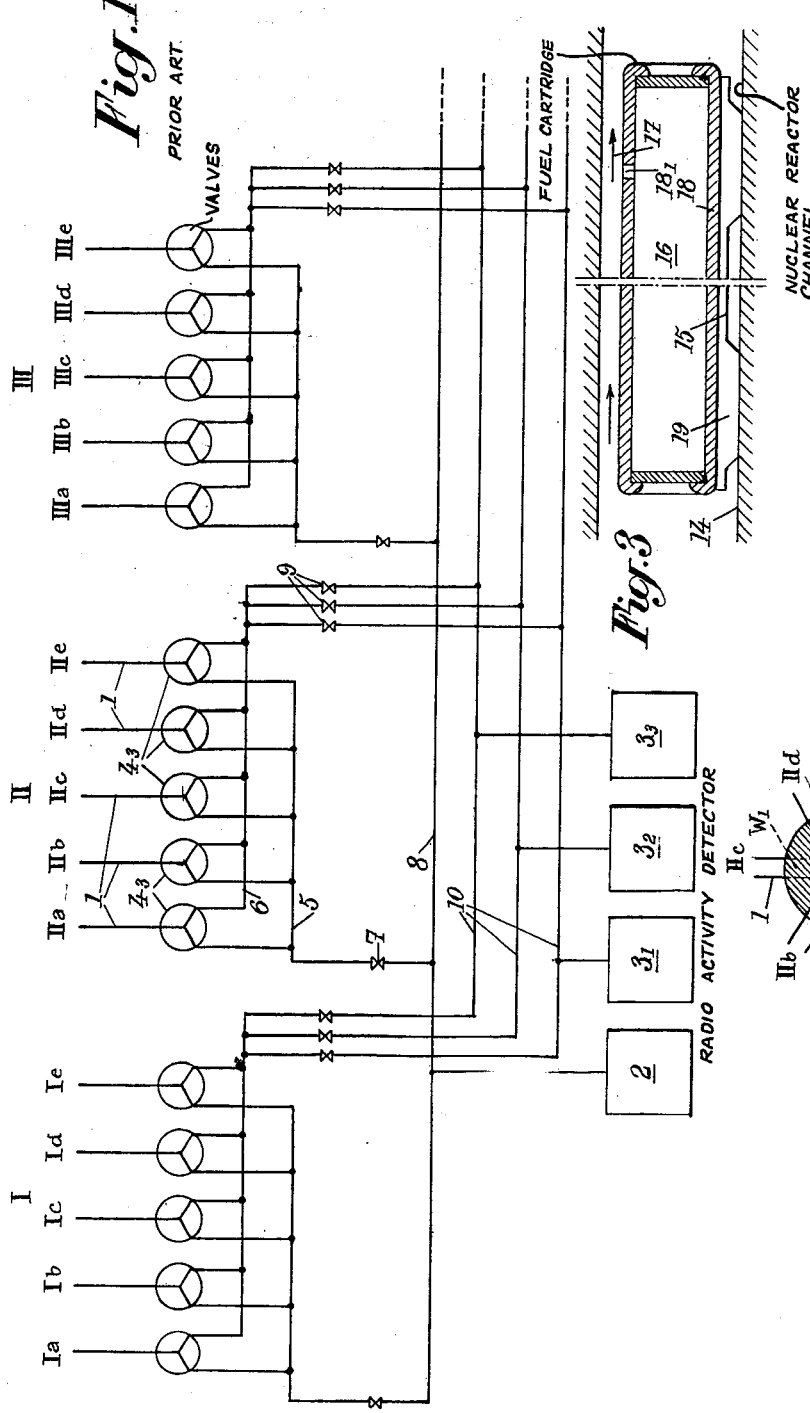

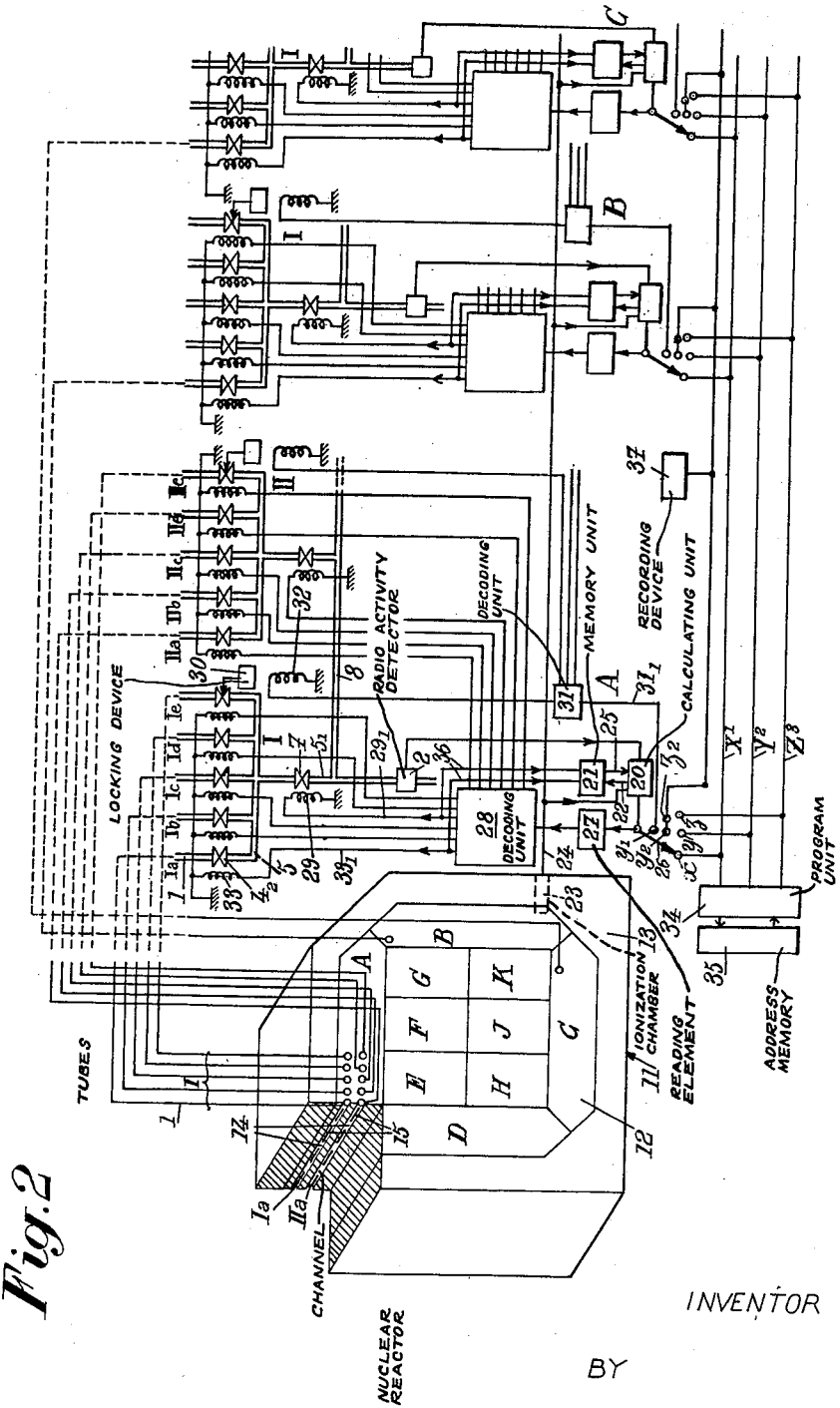

Nov. 5, 1963                        E. PICARD                    3,109,929
      DEVICES FOR THE AUTOMATIC MONITORING OF THE VARIATIONS OF A
          PHYSICAL MAGNITUDE AT A MULTIPLICITY OF DISTINCT POINTS
             AND IN PARTICULAR FOR DETECTING CAN LEAKS IN THE
                  CHANNELS OF A HETEROGENEOUS NUCLEAR REACTOR
Filed Feb. 16, 1960                                       5 Sheets-Sheet 3
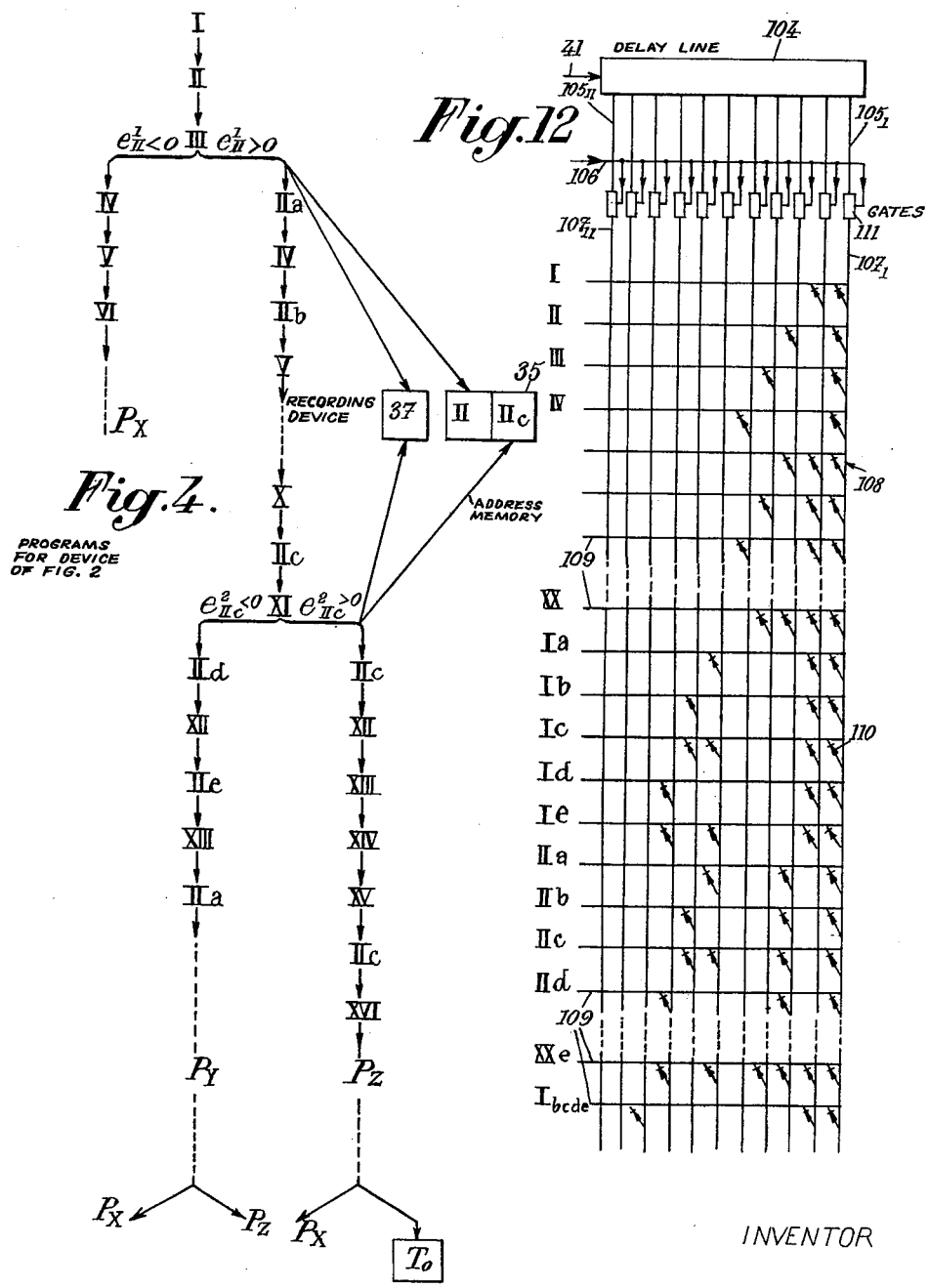
INVENTOR
BY
ATTORNEY Nov. 5, 1963   E. PICARD   3,109,929
DEVICES FOR THE AUTOMATIC MONITORING OF THE VARIATIONS OF A
PHYSICAL MAGNITUDE AT A MULTIPLICITY OF DISTINCT POINTS
AND IN PARTICULAR FOR DETECTING CAN LEAKS IN THE
CHANNELS OF A HETEROGENEOUS NUCLEAR REACTOR
Filed Feb. 16, 1960   5 Sheets-Sheet 4
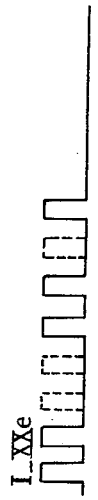
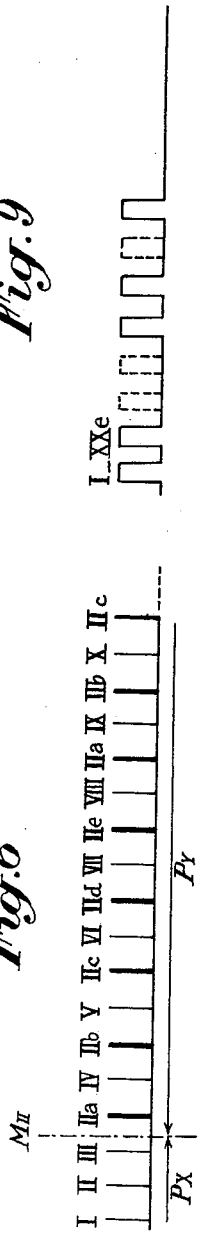
INVENTOR
BY
ATTORNEY

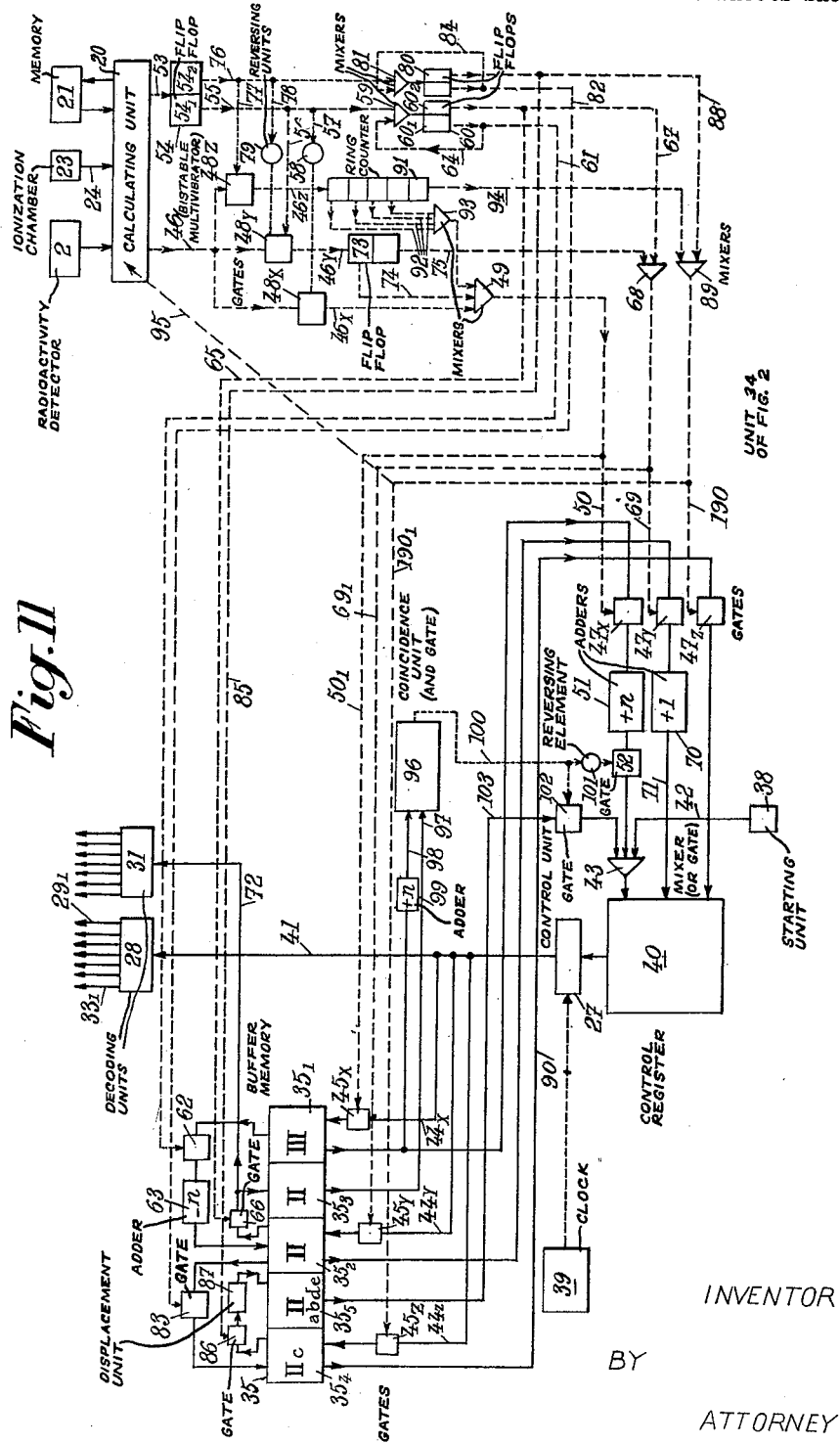

United States Patent Office 3,109,929
Patented Nov. 5, 1963

3,109,929
DEVICES FOR THE AUTOMATIC MONITORING OF THE VARIATIONS OF A PHYSICAL MAGNITUDE AT A MULTIPLICITY OF DISTINCT POINTS AND IN PARTICULAR FOR DETECTING CAN LEAKS IN THE CHANNELS OF A HETEROGENEOUS NUCLEAR REACTOR
Etienne Picard, Gif-sur-Yvette, France, assignor to Commissariat a l'Energie Atomique, Paris, France, an organization of France
Filed Feb. 16, 1960, Ser. No. 9,051
Claims priority, application France Feb. 17, 1959
3 Claims. (Cl. 235—151)

The present invention relates to devices for quickly detecting when a physical magnitude (and in particular one that requires a relatively long time for its measurement) has exceeded a critical or alarm value at any of a multiplicity of points where it is measured and for determining the variations of this magnitude at a point of measurement where said critical value has been exceeded. It should be noted that this critical value may differ from one point of measurement to another and that it may also vary at any point in accordance with the variations of another physical magnitude.

The invention is particularly for use in nuclear reactors of the heterogeneous type (for instance solid moderator reactors cooled by a gas under pressure circulating through a closed circuit) which comprise masses of fissionable material placed in gastight cans. In this case, the object of the invention is to detect leaks in said cans which would result on the one hand in the outflow of fission products into the coolant gas and on the other hand in the attack of the fissionable material by this gas.

There are known devices for detecting can leaks, based upon measurement of the radioactivity of gas streams that have been in contact with nuclear fuel masses, since a can leak causes an increase of the radioactivity of the gas stream flowing along the leaking can, due to the fact that radioactive fission products are allowed to pass into said gas stream.

However, due to the fact that every gas stream is also activated by neutron bombardment as it flows through the reactor, it is necessary to perform selective radioactivity measurements essentially concerned with the fission products, for instance by determining the proportion in the gaseous effluents of radioactive ions (rubidium, cesium ions) generated after some seconds by some fission products (kryptons, xenons). Such a selective measurement, for which it is necessary to collect ions and to determine the radioactivity twice, i.e. before and after this collecting, requires a substantial time, averaging one minute, because every determination must be made for a sufficient time (about 30 seconds) to eliminate statistical counting errors.

Furthermore, solid moderator nuclear reactors comprise a great number of channels (for instance one thousand) in which are housed fuel cans and through which coolant gas streams circulate. In order to detect the channel where a can is leaking, it is necessary to determine the proportion of fission products (for instance of radioactive ions) in each of the gas stream flowing out from the respective channels (by collecting through a tube a portion, ranging from 1 to 5%, of every gas stream). But a continuous monitoring of each of the channels is impossible because it would require too great a number of radioactivity detectors with their electronic systems. In order to comply with such contradictory conditions, the channels of a reactor are divided into groups comprising each N channels and the N channels of each of these groups are themselves divided into a plurality of sub-groups, each of these sub-groups comprising $n$ channels, so that the number of sub-groups in a group is $N/n$. Each of these groups is monitored by means of a single radioactivity detector which successively and cyclically determines the proportion of fission products in the respective sub-groups of this group, the time interval between two successive measurements for a given sub-group, i.e. the period of the cycle of measurements for a group, averaging half an hour. By way of example, in the case of a nuclear reactor including one thousand channels, the respective tubes for collecting samples from these channels (one tube for every channel) are divided into ten groups each of which is provided with a radioactivity detector, each of these groups including one hundred tubes, the hundred tubes of every group being themselves divided into twenty sub-groups corresponding each to five tubes. The radioactivity detector corresponding to every group constitutes a prospecting detector (there are therefore ten prospecting detectors for the whole reactor) intended to detect any rise of the radioactivity above a given critical value, this critical value depending on the one hand upon the sub-group that is considered (the effluents of the peripheral channels of a reactor being less radioactive than the effluents of the channels located in the core of the reactor) and on the other hand upon the total power or reactivity of the reactor. Any rise of the radioactivity above this critical value is determined for instance, as described in the Belgian patent filed by the Commissariat a l'Energie Atomique No. 572,142, on October 17, 1958, and delivered on April 17, 1959, by measuring the power of the reactor at any time and determining (in a calculating unit associated to a memory), if the difference $e^1$ between the ratio:

$$K = \frac{\text{activity at any time for a sub-group}}{\text{power of the reactor at the same time}}$$

and the ratio:

$$K_0 = \frac{\text{activity, at a time } t_0, \text{ for the same sub-group}}{\text{power, at the same time, of the reactor}}$$

is positive or negative for every sub-group (time $t_0$ being either that of the preceding measurement for the same sub-group, or an initial given value).

When the critical value has been exceeded, that is to say when $e^1$ is positive, for a given sub-group, it is necessary to determine the particular channel of this sub-group which contains the leaking can and to follow the evolution of the leak. For this purpose, in prior devices for detecting can leaks, there was provided a second set of detectors, called "follower detectors," which locate said particular channel (by determining in the calculating unit the sign of the difference $e^2$ between the ratio:

$$k = \frac{\text{activity at the time that is considered for a tube}}{\text{power, at the same time, of the reactor}}$$

and the ratio:

$$k_0 = \frac{\text{activity, at a time } t_0, \text{ for the same tube}}{\text{power, at the same time, of the reactor}}$$

successively for every tube of the said sub-group and which subsequently measure the radioactivity of the effluent gases from said channel, at an accelerated rate of repetition, the time $t$ between two successive measurements of this effluent being lower than T ($t$ for instance averaging some minutes) in order to permit a practically continuous monitoring of the evolution of the leak and the withdrawal of the leaking can when this evolution becomes such that an accident might occur.

In order to give a good understanding of the considerable improvements brought by the present invention, FIG. 1 of the appended drawings shows a device of a known type for detecting can leaks for every group of sample taking tubes, a prospecting detector and several follower detectors, and also the valve means for sending to every detector the effluent of every sub-group of tubes or of every tube.

FIG. 1 shows only the three first sub-groups I, II, III of a group of N sample collecting tubes 1, grouped in $N/n$ sub-groups each of which includes $n$ tubes. For the sub-groups shown on FIG. 1, $n$ is equal to 5 and letters $a$, $b$, $c$, $d$, $e$ have been appended to the numerals designating the different tubes of a given sub-group. The system includes on the one hand a prospecting detector 2 and on the other hand $s$ follower detectors only three of which have been shown at $3_1$, $3_2$, $3_3$.

In order to make it possible to send to every detector 2, $3_1$, $3_2$, $3_3$ the gaseous streams collected by the different tubes 1, either individually for every tube or collectively for a whole sub-group, the known devices include:

(1) N three-way valves $4_3$ each of which permits of sending the gas collected by every tube 1 either toward the prospecting detector 2 through conduits 5 or toward the follower detectors 3 through conduits 6 (a conduit 5, and also a conduit 6, being provided for every sub-group);

(2) $N/n$ two-way valves 7, to control the communication of every conduit 5 with a main conduit 8 for collecting the effluents and which passes along the set of prospecting detectors 2; and (3) $\dfrac{N}{n} \cdot s$ two-way valves 9, to control the communication between every conduit 6 and every follower collecting conduit 10 for feeding one of the follower detectors $3_1$, $3_2$, $3_3$.

As long as no leak takes place in the fuel cans, all the valves $4_3$ are kept in the position in which they connect the tubes 1 of every sub-group with the conduit 5 of this sub-group, whereas cyclical switching means (not shown) successively open, in a predetermined manner, valves 7 (normally closed) so that the prospecting detector 2 successively determines the radioactivity in the three sub-groups I, II, III of the group, the measurement being repeated for a given sub-group for instance at an interval of twenty minutes if the whole includes twenty sub-groups and if every measurement requires one minute.

When detector 2, with its electronic system and its calculating unit, detects a rise of the radioactivity above the critical value, therefore every time there is a leak in a fuel can for a given sub-group, for instance for sub-group II, the flow of the gases is switched toward a follower detector such as detector $3_1$, for instance as described in the proceedings of the International Symposium on Nuclear Electronics of Paris 1958, published by the International Agency of Atomic Energy, Vienna 1959 (communications of Messrs. Goupil, Graftieaux and Servent, vol. I, pages 413–423, of Mr. Auriscote, vol. II, pages 257–265, of Mr. Gaudferneau, vol. II, pages 277–282, and of Mr. Picard, vol. II, pages 291–296). For this purpose, the valves $4_3$ of this sub-group are successively brought into the position where they connect the tube 1 in which they are mounted with the conduit 6 of said sub-group, the valve 9 which places this conduit 6 in communication with the collecting conduit 10 associated to detector $3_1$ being kept open, so that the detector determines, together with the computer associated therewith, in which channel is located a leaking can by detecting a positive value of $e^2$ for a given sample taking tube corresponding to this channel. When this particular tube, for instance tube IIc, is determined, the follower detector $3_1$ is permanently assigned to this tube by means of the corresponding valve $4_3$ and of valve 9, whereas the conduit 5 of said given sub-group, such as II, only receives the streams flowing from the four other tubes (IIa, IIb, IId and IIe) of this sub-group through valves $4_3$.

It is necessary to provide several follower detectors 3 so as to be able to follow the evolution of more than one can leak for the group. However, in order to reduce the number of valves 9, only a portion of the followers of a group may be assigned to each of the conduits 6, for instance $s/m$ followers for every conduit 6, so that every follower can be branched on $N/m$ tubes. In this case, it is necessary to have only $$\dfrac{N}{n} \cdot \dfrac{s}{m}$$

valves 9 instead of $$\dfrac{N}{n} \cdot s$$

(number $m$ being for instance equal to 6). But, even with such an arrangement, the monitoring of a group of N channels divided into $N/n$ sub-groups requires, with known systems:

$s+1$ detectors each with the corresponding electronic system,

N three-way valves, $\dfrac{N}{n}\left(1+\dfrac{s}{m}\right)$ two-way valves

With the present invention, it is possible considerably to reduce the number of detectors and of valves because, for monitoring the same group, it is only necessary to have:

one single detector with the electronic system cooperating therewith,

N two-way valves (instead of N three-way valves), and $N/n$ two-way valves (the $$\dfrac{N}{n} \cdot \dfrac{s}{m}$$

two-way valves 9 being dispensed with).

One of the objects of the present invention is to provide a device for monitoring the variations of a physical magnitude at a multiplicity of distinct points, by means of a single instrument capable of measuring the magnitude, of a plurality of magnitude conveying paths extending from each of said respective points to said instrument, said paths forming a single converging system starting at said points and ending in front of said single instrument, and of a restricted number of switch means mounted in said paths, the group formed by said points being divided into a plurality of sub-groups.

This device comprises, in combination, a single instrument capable of measuring the magnitude, a plurality of magnitude conveying paths connected with each of said points for transmitting said magnitude and forming a single converging network starting at said points and ending in front of said single instrument, switch means mounted in said paths for connecting them with said instrument to transmit to said instrument, according to the position of said switch means, either simultaneously the respective magnitudes at all the points of any of said sub-groups, or simultaneously the respective magnitudes at all the points less one of any of said sub-groups, or the magnitude at any of said points, control means connected with the output of said measurement instrument and responsive to the information supplied by said instrument to transmit an alarm signal when the value measured by said instrument exceeds a critical value, switch operating means operatively connected with said switch means, said switch operating means being responsive both to said alarm signal from said control means and to predetermined control programs, said switch operating means being adapted to send operating orders to said switch means to cause them to produce one of the following operations, to wit, first, in the absence of such an alarm signal, to transmit to said instrument the mean value of said magnitude for each of said sub-groups successively according to a first type of control program forming a repeated basic cycle of given period, secondly, in response to such an alarm signal from said control means, to transmit to said instrument both according to a first cycle slightly longer than said basic cycle successively and cyclically the mean value of said magnitude for the respective sub-groups with the exception of that corresponding to said signal and, according to a second cycle shorter than said basic cycle, successively the value of said magnitude at each of the points of the last mentioned sub-group, these first and second cycles being intermixed to form a second type of control program, and thirdly, in response to such an alarm signal from said control means resulting from the value of said magnitude at one particular point of said last mentioned sub-group, to transmit to said instrument, both according to a first cycle slightly longer than said basic cycle, successively and cyclically the mean value of said magnitude for the respective sub-groups, the last mentioned sub-group having said particular point excluded thereof, and, according to a second cycle shorter than said basic cycle, the successive values of said magnitude at said particular point, these two last mentioned cycles being intermixed to form a third type of control program, whereby the evolution of said magnitude at said particular point is followed at relatively small intervals of time.

Preferred embodiments of the present invention will be hereinafter described with reference to the accompanying drawings, given merely by way of example and in which:

FIG. 1 is a diagrammatical view of a system made according to the prior art as above described.

FIG. 2 diagrammatically shows a device according to the invention for monitoring a nuclear reactor having a solid moderator provided with a multiplicity of channels through which coolant gaseous streams are flowing.

FIG. 3 shows a mass of nuclear fuel placed in its gastight can, for use in one of the channels of the reactor of FIG. 2.

FIG. 4 is a synopsis illustrating the order in which the sample connecting tubes connected with the channels of a reactor according to FIG. 2, and also the sub-groups formed by such tubes, are placed in communication with a single radioactivity detector, according to three different and successive types of programs.

FIGS. 5, 6 and 7 show the succession of signals constituting the orders sent toward the switching control means of FIG. 2, respectively for the three types of programs.

FIGS. 8, 9 and 10 illustrate the form of the signals illustrated by FIGS. 5, 6 and 7.

FIG. 11 diagrammatically shows a universal digital computer for use in the device of FIG. 2.

FIG. 12 shows an embodiment of a unit for decoding the switch orders to be used in cooperation with the digital computer of FIG. 11.

FIG. 13 shows a special valve capable of replacing all the valves cooperating with a sub-group of sample collecting tubes.

FIG. 2 diagrammatically shows a nuclear reactor 11 (for instance of the type built in France at Marcoule and in Great Britain at Calder Hall) including a block 12 of solid moderator (for instance graphite) surrounded by a shield 13 (for instance of heavy concrete). A multiplicity of channels 14 disposed for instance parallelly and in the horizontal direction, as shown by the drawings, extend through said block 12. Although heterogeneous reactors generally include about one thousand channels, FIG. 2 only shows some channels 14 two of which are visible in cross-section.

In every channel 14 there is housed a series of cartridges 15 (or possibly a single one) of nuclear fuel. As shown by FIG. 3, such a cartridge includes a mass 16 of fissionable material (for instance natural uranium or uranium enriched in the 235 isotope, either in the metallic form, or in the form of an oxide or other compound) separated from the stream 17 of coolant fluid (such as carbonic acid gas under a pressure of about 10 kg./sq. cm.), flowing through the channel by a gastight envelope or can 18 provided with fins 19.

In order to detect can leaks, a portion (corresponding to some percent) of the stream 17 having flown through every channel 14 is collected, in the known manner, by means of sample collecting tubes 1, and the proportion of fission products in the effluents of tubes 1 is determined. An increase of this proportion indicates a can leak, such as that shown at $18_1$, which brings mass 16 into contact with the coolant fluid and permits fission products from the fluid to pass into the coolant stream.

In view of the great number of channels 14, and therefore of tubes 1 (since there is one tube for every channel), the whole of the channels and tubes cooperating therewith is divided into several groups, for instance ten groups A, B, C, D, E, F, G, H, J, K each of which includes for instance one hundred channels (and tubes), and the hundred tubes 1 of every group are divided into several sub-groups, for instance into twenty sub-groups each including five tubes.

In order to facilitate the following explanations, in every group the twenty sub-groups have been numbered I, II, III, IV . . . XIX, XX, and in every sub-group the five tubes (or channels) thereof are indicated by indexing characters $a, b, c, d, e$.

The five sample collecting tubes 1 of every sub-group are connected with a conduit 5 constituting a sub-collecting conduit, and all the sub-collecting conduits of a group are connected to a common collecting conduit 8 which is monitored, from the point of view of the proportion of fission products in the effluent coolant gas, by the radioactivity detector 2 which serves to control the whole. This detector is advantageously constituted by a scintillation counter with a photomultiplier and the electronic circuit associated therewith so as selectively to determine the proportion of fission products, for instance as described in the above mentioned paper by Mr. Goupil and in the above mentioned Belgian patent, and also in the Belgian Patent No. 577,804, filed by Commissariat a l'Energie Atomique on April 16, 1959, and delivered on October 16, 1959. Two-way valves $4_2$, which are substituted for the three-way valves $4_3$ of FIG. 1, are disposed in every tube 1, and two-way valves 7 are provided in every sub-collecting conduit 5 and collecting conduit 8. FIG. 2 only shows the two first sub-groups I and II of the group A and a portion of the first sub-group I of the groups B and C. In the following description, only group A will be referred to, the operation being the same for the other groups. A Roman numeral (from I to XX) serves to identify both a sub-group and the valve 7 and elements cooperating therewith to control this sub-group, and a Roman numeral (from I to XX) followed by a letter (from $a$ to $e$) serves to identify both a channel and the sample collecting tube cooperating therewith and a valve $4_2$ with its cooperating elements for controlling this tube.

The output signal from detector 2 is sent to a calculating unit 20 which determines, as described in the above mentioned Belgian Patent No. 572,142, now U. S. Patent No. 2,802,461, whether the radioactivity measured by the detector exceeds a given alarm critical value, account being taken of the variation of power or reactivity of the reactor. Therefore, to the calculating unit proper there is combined a memory unit 21 in which are stored up the values of the radioactivity $r_0$, $R_0$, measured in every tube 1 and in every sub-group of tubes, for a given power $P_0$ of the reactor (these values having been sent for storing purposes through a line 22). Unit 20 receives, at any time, not only the value R or r actually measured by the detector for a sub-group or for a particular tube, but also the power P at the same time of the reactor (measured for instance by means of an ionization chamber 23 cooperating with a conventional electronic circuit the output of which is connected to a line 24). Unit 20 determines whether the difference $e^1$ between $$K = \frac{R}{P}$$

and $$K_0 = \frac{R_0}{P_0}$$

for the sub-group in communication with collector 8, or the difference $$e^2 = k - k_0 = \frac{r}{P} - \frac{r_0}{P_0}$$

for the tube in communication with collector 8, is positive or negative.

The output signal of the calculating unit, which is different according to the sign of $e^1$ or $e^2$, produces a switching action (illustrated on the drawing by switch 26 and which will be more completely described hereinafter) between the different types of control programs of the electrically control valves 7 and $4_2$.

FIG. 2 diagrammatically illustrates by three lines $X^1$, $Y^2$, $Z^3$ the three types of programs which will be more explicitly described hereinafter, the output of each of these lines $X^1$, $Y^2$, $Z^3$ being sent by contacts $x$, $y$, $z$, respectively, through switch 26 and the program reading control unit 27 (controlled as hereinafter indicated with reference to FIG. 11), to a decoding unit 28 (illustrated by FIG. 12) which, according to the orders that are received (in coded form) from one of the lines $X^1$, $Y^2$, $Z^3$, opens those of the valves $4^2$ and 7 that must be opened by sending current to their windings 33 or 29.

Before illustrating (with reference to FIGS. 11 and 12) a detailed embodiment of a device according to the invention, the successive steps of the operation thereof will be described with reference to the diagram of FIG. 2. This description is illustrated by the synopsis of FIG. 4 which represents the switching from one program to another one and with reference to FIGS. 5, 6 and 7 which illustrate the succession of the switching orders, represented by sub-group addresses (Roman numerals) or tube addresses (Roman numerals followed by one of the letters $a$, $b$, $c$, $d$, $e$), sent from unit 34 which elaborates the program. This unit 34 cooperates with an address memory 35 for every program (as hereinafter explained), and the signals from unit 34 are sent, through reading element 27, to the decoding unit 28 which controls, through lines $29_1$ and $33_1$, the energizing of windings 29 and 33 and, through lines 36, the selection of the $R_0$ of the desired sub-group or of the $r_0$ of the desired tube in the memory element 21 for transfer to unit 20 through line 25. Of course, in view of the fact that a sufficiently accurate measurement of the proportion of fission products requires about one minute, windings 29 and 33 include delay holding circuits (not shown) which produce, under the effect of a control signal transmitted through a line $29_1$ or $33_1$, the opening for one minute of the corresponding valve 7 or $4_2$.

Initially, according to a first type of program $P_x$ determined by line $X^1$, switch 26 being on contact $x$ as shown, which program may be called the normal or prospecting program, the decoding unit 28 receives successively the addresses I, II, III . . . XIX, XX, I, II . . . of the respective sub-groups (as represented by FIG. 5) and successively opens the corresponding valves 7. During this time, valves $4_2$ are locked in open position by a device 30, for instance a mechanical device. After a first cycle (where the values $P_0$ and $R_0$ for every sub-group are stored up in memory unit 21), calculating unit 20 determines, for every sub-group, during the prospection of the next sub-group by detector 3, whether $e^1$ is positive or negative.

After every determination, calculating unit 20 influences the position of switch 26. As long as $e^1$ is negative, program $P_x$ is maintained (i.e. switch 26 remains on contact $x$) and the orders follow one another according to the predetermined sequence of FIG. 5. On the contrary, if $e^1$ is found to be positive, for instance for sub group II ($e^1_{II}$ positive), program $P_Y$ is substituted for program $P_X$ as indicated on FIG. 4 which shows the two possible alternatives according to the sign of $e^1_{II}$.

This control program of the $P_Y$ type first controls, as illustrated by FIG. 6, the closing of the valves $4_2$ of the sub-group where the critical value has been exceeded, in this case sub-group II, by sending a closing order $M_{II}$ on line $31_1$ (through contact $y_1$) toward the decoding unit 31 which feeds current to the winding 32 corresponding to sub-group II to release the corresponding device 30 and close the valve $4_2$ of said sub-group II which, from this time on, may be opened separately by the feed of current to their winding 33.

As for the second type of program, $P_Y$, which corresponds to line $Y^2$, it consists in intercalating, as illustrated by FIG. 6, into the normal operation cycle (from which however the order for opening the valve 7 of sub-group II has been withdrawn), a shorter cycle including the orders for opening the valves $4_2$ of sub-group II (indicated by symbols II$a$, II$b$, II$c$, II$d$ and II$e$). For instance, there is alternately produced an order for opening a valve 7 and an order for opening a valve $4_2$ (at the same time as an order for opening the valve 7 of the sub-group for which $e^1$ has become positive), which gives a complete cycle of $19 \times 2 = 38$ minutes (19 orders for valves 7 every second minute alternating with 19 orders for valves $4_2$, also every second minute), the short cycle having a period of $5 \times 2 = 10$ minutes.

This program $P_Y$, corresponding to the second column of FIG. 4, also comprises the sending into memory 35 of the address signal II of the sub-group in which $e^1$ has become positive and, in a general manner, the starting of a recording device 37 which gives a graphic record of the output signals from detector 2, said recording device being connected to contact $y_2$ so as to permit a study of the indications of detector 2 as soon as a can leak has been detected. This program $P_Y$ is pursued as long as calculating unit 20 gives a negative value for $e^2$ (after having stored up during a first short cycle the values of $r_0$ and $P_0$ for every tube of sub-group II).

When $e^2$ is positive, for instance when $e^2_{IIc}$ for tube II$c$ is found to be positive (during the examination by detector 2 of the effluents from sub-group XI, as illustrated by FIG. 4), calculating unit 20 causes a shifting to program $P_Z$ (switch 26 coming onto the contact $z$ of line $Z_3$). This program $P_Z$ consists in intercalating into the normal cycle of orders, after $p$ consecutive orders of opening of a valve 7 ($p$ being equal to 4 in the example illustrated by FIGS. 4 and 7), an opening order for the valve $4_2$ of the particular tube for which $e^2$ is positive (and simultaneously for the valve 7 of the sub-group to which this tube belongs). However, the order for connecting sub-group II with detector 2 is concerned only with tubes II$a$, II$b$, II$d$ and II$e$ (where $e^2$ is negative), that is to say it includes only the opening of valves 7 for sub-group II and $4_2$ for tubes II$a$, II$b$, II$d$ and II$e$, the signal corresponding to this order being illustrated by the symbol II$abde$ on FIG. 7.

Positive signal $e^2_{II}$ also controls the inscription in memory 35 of the address II$c$ of the channel in which there is a can leak and continuation of the recording of the indications of calculating unit 20 by device 37 (owing to contact $z_2$). When this device 37 indicates that the value of the radioactivity exceeds a danger value (his value being higher than the critical value for the leaking channel) the man in charge of the reactor causes the fuel cans in this channel to be evacuated (symbol $T_0$ in FIG. 4).

It will be noted that the programs of the $P_Y$ type have only a short duration because, either there is a serious can leak and in this case calculating unit 20 will cause a shifting to program $P_Z$, or in some exceptional cases, it is only an extremely small leak which closes spontaneously and, in this case, after some cycles of program $P_Y$, the man in charge of the reactor will shift back to program $P_X$. The same thing will occur if, during a program of the $P_Z$ type, the evolution of the leak shows that it has closed spontaneously. A return to program $P_X$ from either program $P_Y$ or program $P_Z$ can be effected, for obvious reasons of safety, only by a positive control performed by the man in charge of the reactor after he has checked up the indications recorded by device 37, which gives the history of the evolution of the leak detected by the device according to the invention.

In order to reduce the complexity of the device, it is advantageous to proceed as follows:

The various signals I to XX corresponding to examination of the effluents from a complete sub-group by detector 2, the signals I$a$ to XX$e$ corresponding to examination of the effluent from a single tube by detector 2, and the signals I$bcde$ to XX$abcd$ corresponding to examination of the effluents of four tubes by detector 2 are coded in a binary form, by means of groups of pulses occurring in successive order;

Use is made of a code such as that shown by FIGS. 8, 9 and 10 which illustrate the structure of the signals of FIGS. 5, 6 and 7 for these three types of signals, that is to say including three sub-groups of pulses, to wit a first sub-group with five positions indicating the sub-group of tubes (five binary orders make it possible to represent the twenty sub-groups of tubes), a second sub-group having three positions to represent the letter of the tube placed in communication with the detector (three binary orders make it possible to represent the five tubes of a sub-group) and a third sub-group with three positions to represent, when the particular tube for which $e^2$ is positive has been determined, the signals such as II$abde$ corresponding to a communication being established between the four tubes of a corresponding sub-group with detector 2 (the five possibilities may be represented by three binary orders). Owing to such a code, a signal of the second type (as shown by FIG. 9) for a tube of a given sub-group of tubes or a signal of the third type (as shown by FIG. 10) for four tubes of a given sub-group of tubes, comprises, in its first sub-group, the signal of the first type (represented on FIG. 8) of said given sub-group of tubes, which facilitates the simultaneous feed of current, by means of the decoding unit 28, to the winding 33 of a valve $4_2$ (or of four valves $4_2$) and to the winding 29 of the valve 7 of the same sub-group. Furthermore, if care is taken that said second sub-group for the signal controlling the tube $a$ of a sub-group of tubes (signal I$a$ for instance) is identical to the third sub-group of the signal for controlling the four tubes other than $a$ of the same sub-group of tubes (signal I$bcde$ for instance), it is possible to pass easily from one of these signals to the other, which is advantageous because program $P_Z$ comprises such "complementary" signals.

Finally, in a code given by way of example:

A signal representative of a sub-group of tubes I to XX (FIG. 8) comprises from 1 to 5 pulses in the five possible positions of the first sub-group, A signal representative of a tube I$a$ to XX$e$ comprises, in its first sub-group, the signal representative of the corresponding sub-group of tubes and, in its second sub-group, from one to three pulses in the three possible positions, and A signal representative of four tubes from I$bcde$ to XX$abcd$ comprises, in its first sub-group, the signal representative of the corresponding sub-group of tubes and, in its third sub-group, the signal which, if it were located in the second sub-group, would determine the tube which in fact is excluded from the sub-group of tubes now limited to only four tubes (FIGS. 8 to 10 show in solid lines the pulses that are actually present and in dotted lines the positions without pulse for every sub-group, for a sub-group of tubes, a tube of this sub-group and the four other tubes of this sub-group of tubes, respectively).

Referring now to FIG. 11 (which gives the detail of the block 34 of FIG. 2), it will be explained how it is possible to perform—by means of an information treating machine, also called "digital computer" of the universal type (a computer RW 300 manufactured in France by Société Intertechnique under Thomson-Ramo-Wooldridge license)—the sequential operation of the twenty valves 7 of the sub-groups I to XX and of the hundred valves $4_2$ of the tubes I$a$ to XX$e$, according to the three types of programs $P_X$, $P_Y$, $P_Z$ above referred to, as a function of the outputs of the calculating device 20.

This FIG. 11 shows the chief units of such a computer, to wit: starting unit 38 containing the signals representative of I and II, clock 39, control register 40, arithmetic unit 20, memory 21—because the arithmetic units 20 and the memories 21 of the caculating devices for said groups of tubes in fact belong to the computer—short access time buffer memory 35 for storing up the addresses of the valves open at the time that is considered and of the valves controlling the sub-groups or tubes where it has been found that the critical value is exceeded, reading and transfer control unit 27, elementary units for addition or subtraction represented by rectangular blocks, switching flip-flop circuits and ring counters, switching gates for performing the logical operation AND, represented by square blocks, and mixers or switching gates OR, represented by triangular blocks the points of which indicate their output. These units are brought into play for elaborating coded orders sent to the decoding unit 28 (which is illustrated in a more detailed fashion in FIG. 12) which decodes these orders or signals to feed current to the windings of electrically controlled valves $4_2$ or 7 to be opened. The constructions of such units are well known in the art of digital computers or of sequence automatic devices and any way descriptions thereof will be found in the art, and for instance in:

Wilkes "Automatic Digital Computers," Methuen & Co. Ltd., London,

Naslin "Circuits à relais et automatismes à séquences," Dunod, 1958,

Proceedings of the I.R.E., January 1952, pages 12–29 (description of the "Binac" computer).

If it is supposed that the sequence shown by FIG. 4 is being performed, the device has first been started by sending, from unit 38, the signal I through line 42 and the mixer or gate OR 43 into register 40. This signal I, which produces the opening of the valve 7 corresponding to sub-group I, is sent to the control register 40 through line 41 toward the decoding unit 28 when the clock 39 sends the reading order into the transmission element 27.

A further actuation of unit 38 has for its effect to send the signal representative of II into the decoding unit 28. At the same time that it is sent toward this unit 28, the signal representative of II is also sent into the compartment $35_1$ of the buffer memory 35, through line $44_X$ and gate $45_X$ that is open at this time. During this time, the arithmetic unit 20 of the calculating device determines whether the radio-activity of the effluent from sub-group of tubes I the valve 7 of which has been opened during the preceding period does not exceed the critical value corresponding to this effluent, for the present activity of the reactor, as described in the Belgian Patent No. 572,142 above referred to, by making use of the reference indications (activity $R_0$ of the sub-group and power $P_0$ of the reactor) stored up in memory 21 and of the output signal of the ionization chamber 23, which is transmitted through line 24.

If it is supposed that the activity is normal ($e^1$ negative for sub-group I), a signal or pulse is sent through line 46 to the transfer unit $47_X$ by making use of the branch $46_X$ (the gate $48_X$ of which is normally opened, whereas the gates $48_Y$ and $48_Z$ of branches $46_Y$ and $46_Z$ are normally closed), the element 49 being an OR circuit, also called mixer. The pulse transmitted through line 50 to unit $47_X$ controls the transfer of the contents of the chamber $35_1$ of memory 35 into the adding element 51 which adds $n$ units thereto (which units may be represented by one binary digit in the first sub-group with the code above referred to) and causes shifting from one tube sub-group representative signal to the signal representative of the next sub-group of tubes (for instance, in the case of sub-group II, shifting to the signal representative of sub-group III).

Through gate 52, which is normally opened, and mixer 42 (the functions of which will be hereinafter explained), the signal indicative of sub-group III is thus transferred to the control register 40.

When the next pulse of clock 39 occurs (one minute after the preceding clock pulse), register 40 sends toward the decoding unit 28 and the compartment $35_1$ of the buffer memory (due to the fact that the pulse emitted through line 50 has also opened gate $45_X$, through line $50_1$), the signal indicative of sub-group III and so on as long as $e^1$ remains negative (program $P_X$), through the lines or elements including an X index indicating that this way corresponds to the line $X^1$ of FIG. 2.

On the contrary, when $e^1$ becomes positive, for instance for the sub-group of tubes II (during the opening of the valve 7 of sub-group III), a signal is sent through line 53 to the bistable multivibrator 54 of the flip-flop type, the first stage $54_1$ of which transmits a pulse through line 55, which has for its effect:

On the one hand, to open gate $48_Y$ through line 56 and to close gate $48_X$ through line 57 (circle 58 representing a reversing unit which locks gate $48_X$ when it is energized), and On the other hand, through mixer 59, to produce a setting of flip-flop 60.

The first stage $60_1$ of the flip-flop transmits a first pulse having for its effect:

On the one hand, to ensure through line 61, by opening gate 62, the transfer of the signal from the compartment $35_1$ to the compartment $35_2$ of memory 35, after subtraction of $n$ pulses in the unit 63 so as to enter at $35_2$ the signal representative of the sub-group of tubes where the radioactivity has exceeded the critical value, to wit the signal representative of tube sub-group II in this case, when the signal representative of sub-group II is stored at $35_1$, and On the other hand, through line 64 and mixer 50, to reset flip-flop 60 into its initial state while sending a pulse from the second stage $60_2$ thereof. This pulse has for its effect, on the one hand, through line 65, to enter (without cancellation) the contents of compartment $35_2$ into compartment $35_3$ by opening gate 66 and on the other hand, through line 67, mixer 68 and line 69, to open the transfer gate $47_Y$, while letting the signal indicative of the sub-group of tubes for which $e^1$ is positive pass from compartment $35_2$ toward adding element 70 in which one unit is added to this representative signal in such manner as to add thereto the pulse corresponding to tube $a$, for instance to transform the signal representative of sub-group II into the signal representative of tube II$a$, which is transmitted to control register 40 through line 71. Furthermore, the opening of gate 66 has for its effect to send through line 72 the signal representative of sub-group II to the decoding unit 31 which causes the valves $4_2$ of sub-group II to be unlocked and therefore to close.

On the next clock pulse, the signal representative of tube II$a$ is sent from register 40, on the one hand toward the decoding unit 28 to open the corresponding valves (valve $4_2$ of tube II$a$ and valve 7 of sub-group II), and on the other hand, through line $44_Y$, to compartment $35_2$, gate $45_Y$ having been opened by a pulse in line $69_1$ connected to line 69.

The program $P_Y$ is pursued as long as the channel of the sub-group which contains a leaking can has not been detected, the normal output of the calculating unit ($e^2$ being negative) now taking place through line 46 and branch $46_Y$ due to the fact that gate $48_Y$ is open and gates $48_Y$ and $48_Z$ are closed. Flip-flop 73, which performs the function of a scale of two ring counter, sends a pulse alternately through line 74 and through line 75, which has for its effect, through mixers 49 and 68, alternately to control the transmission gates $47_X$ and $47_Y$ on the one hand, and the gates $45_X$ and $45_Y$ on the other hand.

This arrangement therefore alternately produces the shifting from one sub-group of tubes to the next sub-group for the sub-groups where the radioactivity is normal and the shifting from one tube to the next one in the sub-group where an excessive value of the radioactivity has been detected, use being made every time of control register 40 and, according to the case, of compartment $35_1$ and adding element 51 or compartment $35_2$ and adding element 70, according to the cycles which have been above described, which permits of elaborating the desired signals, such as those representative of sub-group II and tube II$a$, respectively.

When unit 20 sends a second signal indicating a radioactivity above the critical value ($e^2$ positive) corresponding to the tube where the activity of the fission products exceeds the alarm value, the second pulse arriving through line 53 is sent from the stage $54_2$ of flip-flop 54 into line 76, which has for its effect:

On the one hand, to open gate $48_Z$ through line 77 and to close gate $48_Y$ through line 78 and the reversing element 79 and, On the other hand, to operate flip-flop 80 through mixer 81.

The setting of flip-flop 80 has for its effect on the one hand, through line 82, to open gate 83 and to transfer from compartment $35_2$ to the compartment $35_4$ the signal representative of the channel containing a leaking can, for instance the signal representative of channel II$c$, and on the other hand to send a new triggering pulse to flip-flop 80, through line 84 and mixer 81.

The resetting of flip-flop 80 has for its effect:

On the one hand, through line 85 which opens gate 86, to transfer from compartment $35_4$ to compartment $35_5$, in buffer memory 35, the signal "complementary" of the signal representtaive of II$c$, that is to say the signal representative of II$abde$, by a backward displacement in unit 87, by an interval equal to three elementary positions of pulses of the second sub-group of pulses of the signal representative of II$c$ (thus passing from a signal of the type shown by FIG. 9 to a signal of the type shown by FIG. 10) and, On the other hand, through line 88 and mixer 89, to perform on the one hand, through line 190 which opens gate $47_Z$, the transmission, through line 90 and transfer gate $47_Z$, of the contents of compartment $35_4$ (II$c$) into control register 40, and on the other hand, through line $190_1$, the opening of gate $45_Z$.

Therefore, when the next clock pulse occurs, which controls, at 27, the reading of the contents of register 40, the signal representative of II$c$ is sent on the one hand toward unit 28, and on the other hand toward compartment $35_4$ through line $44_Z$ and gate 45 which is open.

From this time on, the pulses coming from unit 20 are sent, when they correspond to a negative evolution, through line 46 and the open gate $48_Z$, to branch $46_Z$ from which they arrive to a scale of five ring counter 91. The first four pulses arrive through lines 92 to a mixer 93, then to mixer 49, and they therefore produce, by opening gate $47_X$, the regular shifting from a signal representative of a sub-group to the signal representative of the next sub-group, owing to the adding element 51, whereas the fifth pulse comes, through line 94 and mixer 89, to open gate $47_Z$ which controls the transfer of the signal indicative of the reactor channel, in which there is a leaking can, from compartment $35_4$ into register 40 and thence toward the decoding unit 28 and again to compartment $35_4$.

It will thus be found that the programs of instructions of the computer contain conditional instructions which take into account the sign of $e^1$ or $e^2$ and two features will be noted, to wit:

That the fact of sending pulses through line 90 has for its effect to block for the next cycle the output 53 to the benefit of the output 46 of unit 20, by means of a control diagrammatically shown at 95, so as to maintain program $P_Z$ without the repetition of a positive evolution in channel IIc modifying this program, whereas another can leak in another channel has for its effect, by sending a pulse through line 53, to repeat the succession of a program of the $P_Y$ type, and of a program of the $P_Z$ type, for this new can leak; and That since the analysis of sub-group II is to be concerned exclusively with channels $a$, $b$, $d$, $e$, there is provided a coincidence unit 96 which receives, through its first input, connected with line 97, the contents of compartment $35_3$, that is to say the signal indicative of the sub-group that contains a leaking can and, through its second input, connected to line 98, the signal that should be sent to unit 28, and this owing to an element 99 which adds $n$ units to the signal contained in compartment $35^1$. When the signal representative of the above mentioned sub-group (sub-group II) is actually to be sent, a coincidence signal is transmitted by unit 96 through line 100, and this signal has for its effect, on the one hand to lock, through reversing element 101, gate 52 (thus avoiding the passage therethrough of the signal corresponding to a complete sub-group), and on the other hand to open gate 102, which permits the transfer through line 103, from compartment $35_5$ where it is stored up, of the signal II$abde$ toward mixer 43 and thence to the control register 40.

It remains to explain how the decoding unit 28 permits, in response to groups of pulses or coded signals applied thereto, of feeding current to the windings which control the opening of valves $4_2$ and 7. Such a decoding unit is illustrated by FIG. 12, it being however understood that other types of decoding units well known to someone skilled in the art could be used, such units being described in the above cited books and articles.

The pulses coming behind one another through line 41 are applied to a delay line 104 including eleven output taps separated by ten equal sections, so as to transmit, through the eleven output lines 105, trains of pulses offset with respect to one another, the delay introduced by every section of said delay line being equal to the elementary interval separating two pulse positions in a coded signal. Therefore, a pulse occupying a first position in a signal of the type shown by FIG. 10 arrives to line $105_1$ at the same time as a pulse occupying the last possible position (eleventh position) arrives to line $105_{11}$.

A clock pulse being applied through line 106 simultaneously to the eleven gates 111, exclusively at the time when a pulse occupying the first position would arrive through line $105_1$ and a pulse occupying the last position through line $105_{11}$, there is produced a tranformation of the pulses transmitted in series through line 41 into pulses occurring in parallel through the eleven lines $107_1$ to $107_{11}$. Consequently, the sequence of series pulses of line 41 is found at the input of the decoding unit proper 108, from line $107_1$ to line $107_{11}$. These pulses are transmitted through lines $107_1$ to $107_{11}$ which cooperate with a series of two hundred twenty lines 109, to wit twenty lines for controlling the twenty valves 7 (these twenty lines corresponding to numerals I to XX according to the sub-group to which they correspond), one hundred lines corresponding to the opening of only one of the valves $4_2$ (these lines being indicated by references from I$a$ to XX$e$) and finally one hundred lines corresponding to the opening of four valves $4_2$ in the same sub-group (corresponding to reference characters I$bcde$). These lines 109 are connected to lines $31_1$ and $29_1$ (FIG. 2).

Diodes 110 are connected between lines 107 and lines 109 in such manner that the transmission of a series signal through line 41 and therefore of a parallel signal through lines 107 has for its effect to feed the corresponding line 109 (such a line being fed with current only when all the diodes connected with this line are fed simultaneously with current). It will be seen that owing to the code that is used, the sending of a signal corresponding to the opening of a valve $4_2$, or of a group of four valves $4_2$, also produces the opening of the valve 7 of the same sub-group, due to the fact that this signal comprises in its first sub-group of pulses (constituted by the first five positions) the signal indicative of said valve 7.

As for decoding device 31, it is similar to decoding device 28, but comprises only five horizontal lines, such as 107, and twenty vertical lines such as 109, the delay line including only five output taps in view of the fact that it is then merely desired to control, through a group of pulses which may occupy five different positions (first sub-group), one of the twenty lines that feed current to coils 32 according to the signals sent through line 72.

The means for controlling the valves of group A have been fully described. Control of groups B, C . . . K is identical. However it is advantageous, in order to reduce the consumption of peak current, to offset the cycles of every group by offsetting for instance the transmission of the clock pulse for the different groups by $\frac{1}{10}$ of the duration of a measurement, that is to say, in the particular example that has been chosen, by 6 seconds. In this way, between two clock pulses sent through unit $27_1$ corresponding to group A, nine clock pulses intended for groups B, C . . . K take place successively at time intervals of six seconds.

It should be well understood that calculating and control units for the ten groups are grouped in the same digital computer, in which have been merely inscribed the different types of programs, by providing the order of analysis of the different groups, for instance from A to K, the order of examination of the different sub-groups (predetermined sequence constituting program $P_X$), the duration of a measurement which determines the intervals at which the clock pulses take place, the duration of the elementary pulses (constituting a signal) which determines the length of every section of the delay line 104 and the insertions, into the normal cycles, of the second and third programs $P_Y$ and $P_Z$, of orders relative to the tubes for which $e^1$ or $e^2$ is positive, which determines the number of stages of counters 73 and 91.

Finally it will be noted that it is possible, without departing from the scope of the invention, to provide for every sub-group a kind of valve as shown by FIG. 13 which includes two movable distribution valve elements, to wit a part $W_1$ which permits, in one of its five opening positions, to send to the output sub-collecting conduit $5_1$ (corresponding to the conduit $5_1$ of FIG. 2) the effluent of a particular tube 1 of the sub-group, and a part $W_4$ which permits, in one of its five opening positions, to send to the sub-collecting conduit $5_1$ the effluents of four tubes 1 of this sub-group. Such a valve may be used instead of the five valves $4_2$ and of the valve 7 of a sub-group because it permits of sending to the sub-collecting conduit $5_1$ either the effluent from a single tube ($W_1$ open, $W_4$ closed), or the effluent from four tubes ($W_1$ closed, $W_4$ open), or the effluent from the five tubes ($W_1$ and $W_4$ open), or no effluent at all ($W_1$ and $W_4$ closed), decoding unit 28 sending for this purpose, through its two hundred and twenty outputs, the eleven possible orders of opening for each of the twenty valves of the type shown by FIG. 13, the closing order for every valve being sent through the twenty outputs of unit 31.

Of course, it must be well understood that while the invention is more particularly described with reference to the monitoring of radioactivity in the channels of a nuclear reactor, it might be applied to the monitoring of other physical magnitudes (temperature, pressure, neutron flux, etc.).

I claim:

1. A device for monitoring the variations of a physical magnitude at a multiplicity of distinct points, the group formed by said points being divided into a plurality of sub-groups, this device comprising, in combination, a single instrument capable of measuring said magnitude, a plurality of magnitude conveying paths connected with each of said points for transmitting said magnitude and forming a single converging network starting at said points and ending in front of said single instrument, switch means mounted in said paths for connecting them with said instrument to transmit to said instrument, according to the position of said switch means, either simultaneously the respective magnitudes at all the points of any of said sub-groups, or simultaneously the respective magnitudes at all the points less one of any of said sub-groups, or the magnitude at any of said points, control means connected with the output of said measurement instrument and responsive to the information supplied by said instrument to transmit an alarm signal when the value measured by said instrument exceeds a critical value, switch operating means operatively connected with said switch means, said switch operating means being responsive both to said alarm signal from said control means and to predetermined control programs, said switch operating means being adapted to send operating orders to said switch means to cause them to produce one of the following operations, to wit, first, in the absence of such an alarm signal, to transmit to said instrument the mean value of said magnitude for each of said sub-groups successively according to a first type of control program forming a repeated basic cycle of given period, secondly, in response to such an alarm signal from said control means, to transmit to said instrument both according to a first cycle slightly longer than said basic cycle successively and cyclically the mean value of said magnitude for the respective sub-groups with the exception of that corresponding to said signal and, according to a second cycle shorter than said basic cycle, successively the value of said magnitude at each of the points of the last mentioned sub-group, these first and second cycles being intermixed to form a second type of control program, and thirdly, in response to such an alarm signal from said control means resulting from the value of said magnitude at one particular point of said last mentioned sub-group, to transmit to said instrument, both according to a first cycle slightly longer than said basic cycle, successively and cyclically the mean value of said magnitude for the respective sub-groups, the last mentioned sub-group having said particular point excluded thereof, and, according to a second cycle shorter than said basic cycle, the successive values of said magnitude at said particular point, these two last mentioned cycles being intermixed to form a third type of control program, whereby the evolution of said magnitude at said particular point is followed at relatively small intervals of time.

2. A device according to claim 1 which comprises a digital computer adapted to treat said operating orders in the form of coded indications, said computer including a registering unit and a memory unit between which circulate in substantially closed circuits, the successive signals representative of the operating orders that have been carried out or are to be carried out, calculating means disposed in at least some of said circuits and capable of elaborating, from a signal representative of an order that has been carried out, the signal representative of the next order to be carried out within the scope of one of the above cited cycles and other calculating means adapted to determine in response to an alarm signal as above mentioned and from an order signal stored up in said memory unit the address signal of said sub-group or of said particular point where the critical value has been exceeded and also the address signal of said sub-group having said particular point excluded therefrom.

3. A device according to claim 2 which comprises at least one decoding unit arranged to receive sequentially from said registering unit the coded signals of the different operating orders to be obtained and to transform these last mentioned signals into actual controlling orders distributed to the switch means corresponding thereto.

References Cited in the file of this patent

FOREIGN PATENTS 752,932    Great Britain _____ July 18, 1956

OTHER REFERENCES

Bowen: "Data Processing . . . Systems," published in Nuclear Power, March 1957, pp. 91–97.